UNITED STATES PATENT OFFICE.

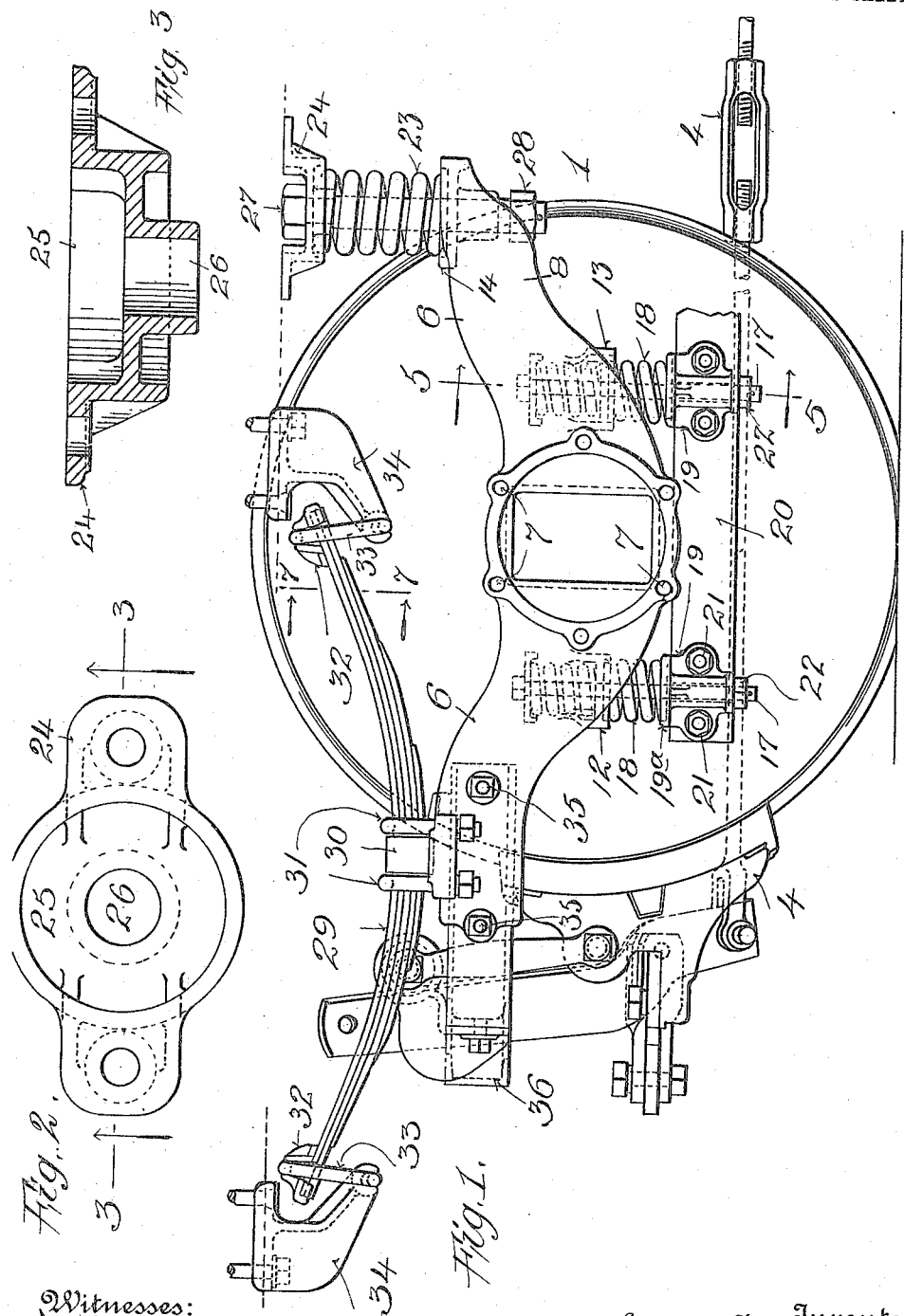

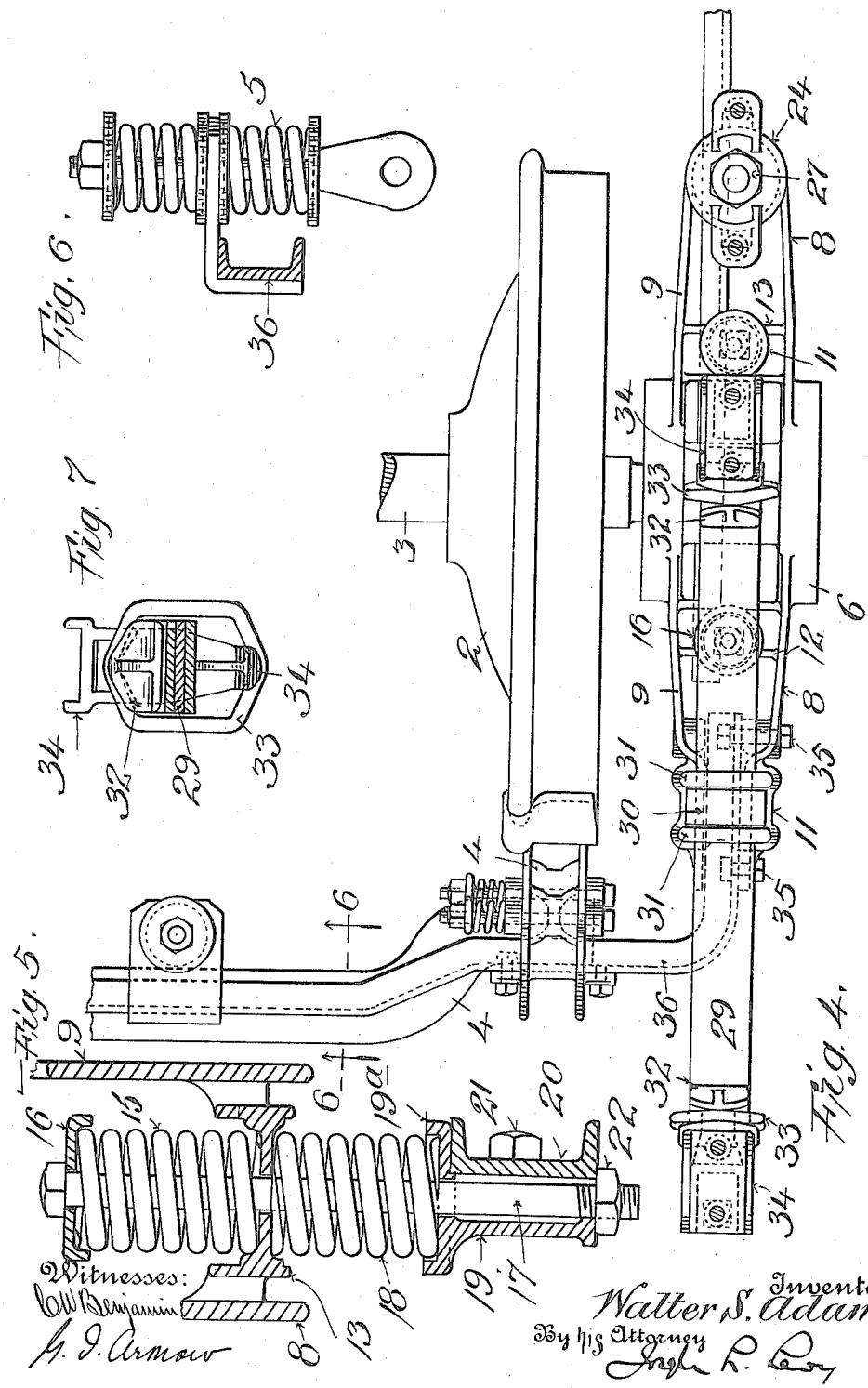

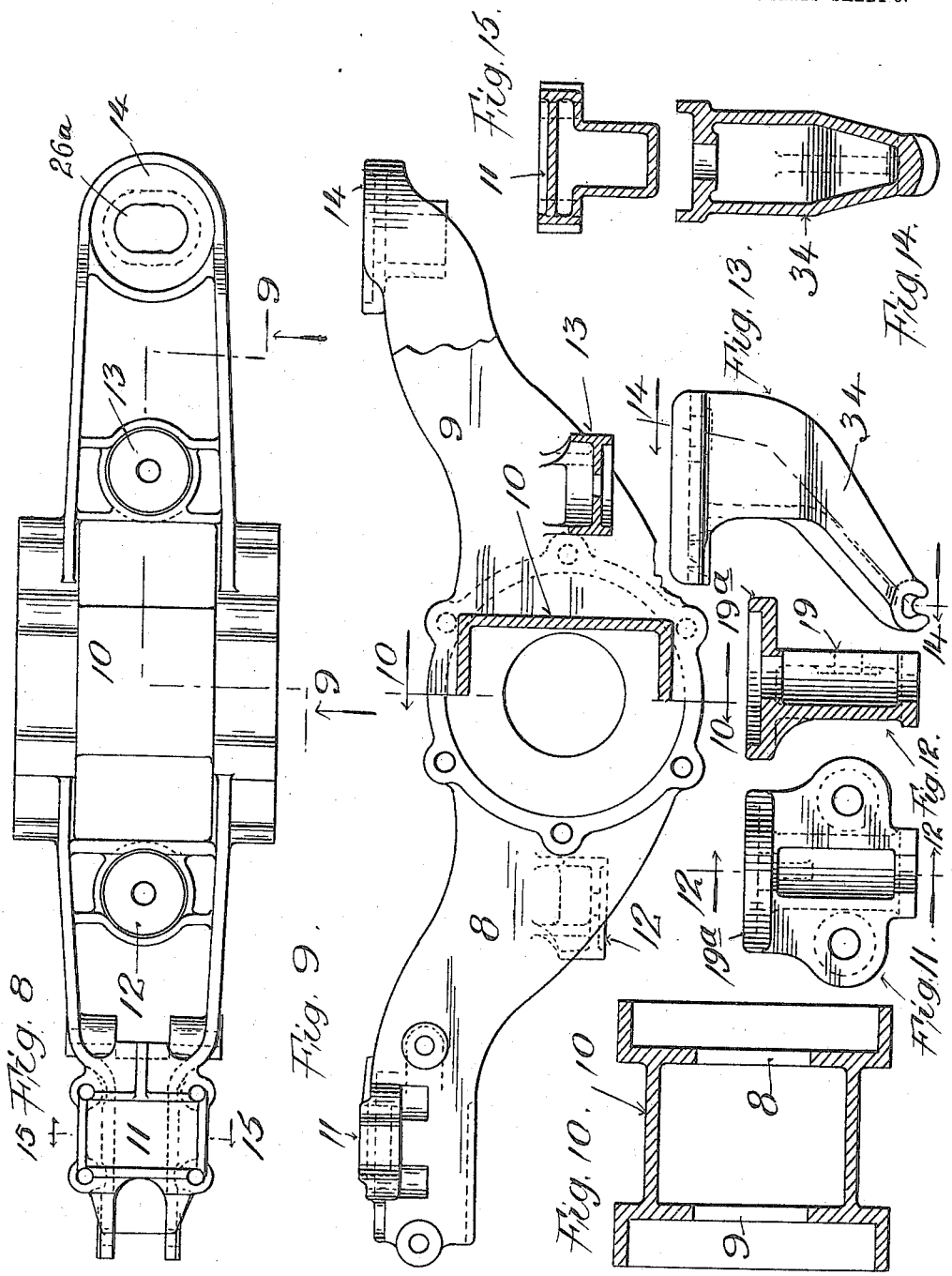

WALTER S. ADAMS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

CAR-TRUCK.

1,133,252.  Specification of Letters Patent.  Patented Mar. 30, 1915.

Application filed June 5, 1913. Serial No. 771,799.

*To all whom it may concern:*

Be it known that I, WALTER S. ADAMS, a citizen of the United States, and a resident of the city of Philadelphia, county of Philadelphia, and State of Pennsylvania, have invented a new and useful Improvement in Car-Trucks, of which the following is a specification.

The object of my invention is to provide a suitable truck for storage battery cars, which truck will be light, durable, efficient and satisfactory under all the conditions of service. This object is accomplished by my invention, one embodiment of which is hereinafter set forth.

For a more particular description of my invention, reference is to be had to the accompanying drawings, forming a part hereof, in which:

Figure 1 is a side elevation of a portion of my improved truck. Fig. 2 is an inverted plan view of a spring cap. Fig. 3 is a sectional view, taken on the line 3—3 of Fig. 2, looking in the direction of the arrows. Fig. 4 is a plan view of a portion of the structure shown in Fig. 1. Fig. 5 is a sectional view taken on the line 5—5 of Fig. 1, looking in the direction of the arrows. Fig 6 is a sectional view, taken on the line 6—6 of Fig. 4, looking in the direction of the arrows. Fig. 7 is a sectional view, taken on the line 7—7, of Fig. 1, looking in the direction of the arrows. Fig. 8 is a plan view of an axle box. Fig. 9 is partly a sectional view, taken on the line 9—9 of Fig. 8, looking in the direction of the arrows, and partly a side elevation. Fig. 10 is a sectional view, taken on the line 10—10 of Fig. 9, looking in the direction of the arrows. Figs. 11 and 12 show a bracket for a spring post with a seat for a spring, the bracket being used to hold the lower end of the post, Fig. 12 being taken on the line 12—12 of Fig. 11, looking in the direction of the arrows. Figs. 13 and 14 show a bracket for supporting a car body from one end to the elliptical spring, Fig. 14 being taken on the line 14—14 of Fig. 13, looking in the direction of the arrows. Fig. 15 is a sectional view taken on the line 15—15 of Fig. 8, looking in the direction of the arrows.

Throughout the various views of the drawings, similar reference characters designate similar parts.

The invention herein disclosed may be applied to a truck 1 which may be either connected directly to a car body, where extreme lightness is desired, or to top chords, not shown, which may be attached to a car body. In either case this truck 1 is provided with the usual wheels 2, axle 3, brake mechanism 4 and electric motor supports 5 all of which may be of the conventional form. The axles 3 are journaled in axle boxes 6 which have novel features. These axles 3 bear directly on suitable roller or other bearings, not shown, which may be of the conventional form. These bearings are secured to the axle boxes 6 by means of bolts or cap-screws which pass into suitable perforations, 7, which are located in the usual manner.

The axle boxes 6 have suitable side webs 8 and 9 united by a crossing 10 and spring seats 11, 12, 13 and 14, the spring seat 11 being for a semi-elliptic spring and located at one end of the webs 8 and 9. The spring seats 12 and 13 are located symmetrically on each side of the crossing 10 and the spring seat 14 is located at the other end of the webs 8 and 9 and is suitable for coiled spring.

The spring seats 12 and 13 each carry suitable coiled springs 15, (see Fig. 5,) which is surmounted by a suitable cap 16 from which hangs a suitable bolt or spring post 17, which passes through a suitable perforation in the seat 12 or 13 and also through a coiled spring 18 between the seat 12 or 13 and a seat $19^a$ on a clamp 19 and between this clamp and a tie-bar 20, the clamp and tie-bar being held together by means of suitable bolts 21. By means of the nut 22 at the lower end of the spring post 17 the springs 15 and 18 are put under suitable tension so that the axle box 6 will ride substantially true at all times regardless of the difference in action between leaf and coiled springs on the application of the brakes. The tie-bar 20 unites the two axles 6 on the same side of the truck. This tie bar 20, in conjunction with the posts 17 and springs 18 serves to prevent tilting of the axle box under the normal conditions of service. This tie bar constitutes an equalizing bar.

The spring seat 14 carries a suitable coiled spring 23, is surmounted by a suitable cap 24, and this cap rests against a top chord or the car body and is secured to one or the other, according to which structure is used.

In the structure shown this cap is secured to the car body. This cap 24 is provided with a suitable cup 25 and central perforation 26 so as to receive a suitable spring post 27 which passes therethrough, and also through the seat 14. This perforation 26ª is elongated as shown in Fig. 8 so as to permit a transverse swinging of the car body. A nut 28 near the bottom of this post 27 limits the movement of the post 27 in the direction of its axis. This post 27 is bolted rigidly to the cap 24 and is loose in the seat 14 to permit some movement of the axle box 6 with regard to the car body.

The seat 11, which is shown in section in Fig. 15, carries a semi-elliptic spring 29 in the conventional manner, that is the band 30 of this spring rests on said seat and suitable U bolts 31 secure the spring 29 in place. The free ends of the spring 29 carry suitable seats 32 in which rest swing links 33 which also engage suitable brackets 34 which are connected, as shown, or otherwise, as desired, so that the car body is carried by the cups 24 and the brackets 34 and is always spring supported while so carried in a manner which permits a limited transverse or vertical movement. The parts are preferably shaped as shown in Fig. 7, so as to facilitate this result.

Below the seat 11 and fixed to the axle box 6 by suitable bolts 35 is secured the crossing 36 from which are carried both the brake rigging 4 and the motor support 5.

When a truck frame is made as above set forth the batteries may be carried by the tie-bar 20 or otherwise, as desired. The bars may also carry the motor should such a construction be desired. In any event, when the truck is in use and the car is loaded so that the springs 23 and 29 are compressed the axle 3 can shift to a slight extent as above stated because of the flexible connections of the springs to the car body. It is also true that the axle boxes 6 will be held in proper relation and in their normal condition without regard to the difference in action between the springs 23 and 29 because of the tension on the springs 15 and 18 as above set forth.

While I have shown and described one embodiment of my invention, it is obvious that it is not restricted thereto, but is broad enough to cover all structures that come within the scope of the annexed claims.

What I claim is:

1. In a truck of the class described, an axle box, a coiled spring carried by said axle box, a leaf spring carried by said axle box and means connected to said axle box for preventing the same from being tilted under the normal conditions of service.

2. In a truck of the class described, a tie-bar, an axle box, a spring seat in said axle box, springs above and below said seat and a spring post connecting said spring seat and tie bar so that the axle box is prevented from tilting under the normal conditions of service.

3. In a truck of the class described, means for supporting a car body comprising wheels, axle boxes, extensions from the axle boxes, spiral springs on the inner extensions, leaf springs on the outer extensions, brackets, links securing the ends of the leaf springs to the brackets and adapted to have relative transverse movement, and means for tying the axle boxes together at each side of the truck.

4. In a truck of the class described, a tie-bar, a clamp secured to the said tie-bar with a spring seat thereon, a spring mounted on said seat, a second seat on top of said spring, a second spring on said seat, a cap on said second spring and a spring post passing through said springs and seats.

5. In a truck of the class described, a tie-bar, a clamp with a spring seat secured to said tie-bar, a spring resting on said seat, a second seat resting on said spring, a second spring resting on said seat, a cap resting on said second spring, and a spring post passing through said cap and seat and secured by said clamp, and a nut on said post for putting tension on said springs.

6. In a truck of the class described, an axle box, a leaf spring carried thereby, seats on said spring, brackets and links carried by said seats and connecting the brackets and seats, said links, brackets and seats being so shaped as to permit a swinging of the car body supported from said brackets, and a coiled spring adapted to support a car body from said axle box.

7. In a truck of the class described, an axle box, a leaf spring carried thereby at a substantially horizontal distance from the journal, seats on said spring, brackets and links carried by said seats and connecting said brackets, said parts being so shaped as to permit a limited movement in any direction between said brackets and seats, and means to prevent the box from tilting in a vertical plane when under influence of load.

8. In a truck of the class described, an axle box, a semi-elliptic spring carried by an extension on said axle box, seats on said spring, brackets, and links carried by said seats connecting them with said brackets, said links, seats and brackets being so shaped as to permit a limited transverse movement of a car body when the axle box and the parts carried thereby are in use.

9. In a truck of the class described, an axle box, a coiled spring at one end thereof and a leaf spring at the other and means for preventing a tilting of the axle box when the truck is in use.

10. In a truck of the class described, a tie bar and posts rising therefrom, and an axle box provided with spring seats through which said posts pass, springs above and below said seats and surrounding said posts, two more seats for springs on said axle box and a leaf spring on one of these seats and a coiled spring on the other.

11. In a truck of the class described, a tie bar having two posts rising therefrom, an axle box with two spring seats through which said posts pass, springs surrounding said posts and above and below said seats, two more spring seats on said axle box, a coiled spring carried by one of these seats and a leaf spring carried by the other, and shackles carried by said leaf spring adapted to be connected to projections from a car body.

12. In a truck of the class described, a tie bar with spring posts rising therefrom, an axle box with spring seats through which said posts pass, springs above and below said seats and surrounding said posts, two more spring seats carried by said axle box, one of these seats adapted to receive a spring post with a spring surrounding the same, the spring posts and seats being so connected that the post is permitted a transverse movement in said seat, and a leaf spring supported by said other seat.

Signed at the city of Philadelphia, county of Philadelphia, and State of Pennsylvania, this 20th day of May, 1913.

WALTER S. ADAMS.

Witnesses:
 HENRY C. ESLING,
 H. F. McKILLIP.

Copies of this patent may be obtained for five cents each, by addressing the "Commissioner of Patents, Washington, D. C."